(12) United States Patent
Beom (10) Patent No.: US 7,426,309 B2
(45) Date of Patent: Sep. 16, 2008

(54) METHOD OF CONTROLLING ENCODING RATE, METHOD OF TRANSMITTING VIDEO DATA, ENCODING RATE CONTROLLER FOR VIDEO ENCODER, AND VIDEO DATA TRANSMISSION SYSTEM USING THE ENCODING RATE CONTROLLER

(75) Inventor: Jae-Young Beom, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 825 days.

(21) Appl. No.: 10/869,118

(22) Filed: Jun. 16, 2004

(65) Prior Publication Data

US 2005/0036698 A1    Feb. 17, 2005

(30) Foreign Application Priority Data

Aug. 12, 2003    (KR) ............... 10-2003-0055877

(51) Int. Cl.
G06K 9/36    (2006.01)
G06K 9/46    (2006.01)

(52) U.S. Cl. .................................... 382/239

(58) Field of Classification Search ........... 382/164, 382/173, 232, 233, 238, 239, 250, 251, 284, 382/305; 375/240.02, 240.03, 240.12, 240.2, 375/240.24; 348/403.1, 439.1
See application file for complete search history.

(56) References Cited

U.S. PATENT DOCUMENTS 4,302,775 A * 11/1981 Widergren et al. ..... 375/240.06
5,291,282 A * 3/1994 Nakagawa et al. ..... 375/240.23
5,592,225 A * 1/1997 Kurobe .................. 375/240.03
5,796,434 A * 8/1998 Lempel .................. 348/403.1
5,956,153 A * 9/1999 Hirabayashi ............ 382/239
5,987,175 A * 11/1999 Imaizumi et al. ........ 382/232
6,115,423 A * 9/2000 Shen et al. .............. 375/240.03
6,282,241 B1* 8/2001 Saw ...................... 375/240.01
6,356,309 B1* 3/2002 Masaki et al. ........... 348/439.1
6,714,594 B2* 3/2004 Dimitrova et al. ....... 375/240.16
6,961,376 B2* 11/2005 Wu et al. ................ 375/240.12
7,103,099 B1* 9/2006 Paz et al. ................ 375/240.03
2005/0036698 A1* 2/2005 Beom ..................... 382/239

* cited by examiner

Primary Examiner—Amir Alavi
(74) Attorney, Agent, or Firm—F. Chau & Associates, LLC

(57) ABSTRACT

A method of controlling an encoding (bit) rate and a method of transmitting video data, and an encoding (bit) rate controller for a video encoder and a video data transmission system employing the methods, wherein the number of bits is allocated to a current picture on the basis of previous encoding results without defining a relation between an encoding rate and the distortion, the limited number of bits is not forced when features of the current picture are different from those of the previous pictures, and a quantizer scale is set adaptively to various features of the current picture without using an additional number of bits corresponding to variation of the quantizer scale, so that it is possible to improve the picture quality of video data to be displayed on a monitor by using such real time variable bit-rate control.

18 Claims, 4 Drawing Sheets

| CODE | q_scale_type | |
|---|---|---|
| | 0 | 1 |
| 0 | | |
| 1 | 2 | 1 |
| 2 | 4 | 2 |
| 3 | 6 | 3 |
| ⋮ | ⋮ | 4 |
| | | ⋮ |
| | | 8 |
| | | 10 |
| | | 12 |
| | | 14 |
| | | ⋮ |
| | | 24 |
| | | 28 |
| | | 32 |
| | | 36 |
| | | ⋮ |
| 31 | 62 | |

METHOD OF CONTROLLING ENCODING RATE, METHOD OF TRANSMITTING VIDEO DATA, ENCODING RATE CONTROLLER FOR VIDEO ENCODER, AND VIDEO DATA TRANSMISSION SYSTEM USING THE ENCODING RATE CONTROLLER

BACKGROUND OF THE INVENTION

This application claims the priority of Korean Patent Application No. 2003-55877, filed on Aug. 12, 2003, in the Korean Intellectual Property Office, the disclosure of which is incorporated herein in its entirety by reference.

1. Field of the Invention

The present invention relates to a video data transmission system, and more specifically, to a method of transmitting video data, and a method of controlling an encoding (bit) rate, an encoding (bit) rate controller for a moving picture expert group 2 (MPEG-2) video encoder, and a video data transmission system performing the methods.

2. Description of the Related Art

In the related art, two general methods of controlling an encoding rate in MPEG-2 video encoders have been employed. One such general method is the constant bit-rate (CBR) control method, and the other is the variable bit-rate (VBR) control method. In a constant bit-rate control method video data, such as digital television (DTV) broadcasting signals, are encoded into a predetermined number-of-bits per a predetermined time, and buffer constraints are imposed to circumvent large deviations from a desired rate at any instant in time. A typical CBR method enforces a constant bit rate (CBR) for a group of pictures (GOP) regardless of the complexity of the video interval. This scheme assumes equal weighting of bit distribution among GOPs and reduces the degree of freedom of the encoding task. The GOP distortion (quality) is minimized (maximized) subject to a constant target rate. CBR implies the sustainable rate of the encoded video stream per GOP is close to a constant target rate, but the instantaneous rate changes per picture depending on picture type2 or the quantization scaler.

An MPEG-2 sequence is typically partitioned into small intervals called GOPs (groups of pictures), which in turn are categorized by picture types "I" (intracoded or intrapicture), "P" (predicted), and "B" (bidirectionally predicted). The number of bits per GOP is distributed such that the allocation for an I-picture is more than that for a P-picture. This is because a P-picture uses a motion-estimation (ME) technique to estimate its content; as a result, a motion-compensated frame difference (MCFD) with a lower entropy than the original source is encoded. B-pictures use the smallest number of bits because their ME techniques are more intensive than those for P-pictures. This method provides a basis for maintaining the same picture quality within a GOP when pictures of different types are encoded.

CBR MPEG-2 encoders enforce different quantizing scalers for each picture type to achieve good-quality streams within a GOP. In the constant bit-rate control method, since both of still picture video data and motion picture video data are encoded into the same number of bits, the quality of the motion pictures, to which more bits should be allocated, is relatively low. One way to improve the perceptual quality of a CBR stream while maintaining its constant rate from start to finish is to identify "difficult-to-encode" pictures and increase their bit budget accordingly. Conventional approaches to real-time CBR encoding use picture-to-picture correlations in terms of "complexity" measures to predict the level of encoding-difficulty of a particular picture. If the statistical features of the image source changes rapidly over time, a constant-bit-rate (CBR) operation may result in good picture quality for a short time window (e.g., a few frames or a GOP) but discontinuous quality when the entire video is perceived by a consumer.

In the variable bit-rate (VBR) control method, since more bits can be allocated to the motion picture video data when data transmission rate is variable, such as in a case where the bandwidth is large enough or storage mediums such as digital video disks (DVDs) are used, it is possible to improve the quality of the motion pictures as compared with using the constant bit-rate (CBR) control method. The video data, which are compressed by encoding the video data (e.g., obtained from video cameras), can be transported through wireless LANs or DTV transmitters, and output as radio frequency (RF) signals. Additionally, the compressed video data can be coded and recorded on fixed media such as DVD optical disks, etc.

The quality of the decoded images is a direct consequence to the number of bits invested in the encoding process. The adjustment of the quantization scaling parameter is a method to influence the number of coding bits. A conventional method of adjusting quantizer scale as a macroblock quantization parameter is mainly used for controlling the encoding rates of the MPEG-2 video encoders. Each picture, of any type, is subdivided into square blocks of pixels called macroblocks. Each picture is composed of slices which are, by definition, a series of macroblocks. The "macroblock" means pixel data (for example, 16×16 pixels) of a relevant window when "I" (intra-coded picture) frame data, "P" (predictive-coded picture) frame data and "B" (bidirectionally predictive-coded picture) frame data require predetermined windows. The pixel data representing luminance (gray levels) is typically 8-bit data. The picture quality and rate of an MPEG-2 encoder is achieved for a particular picture by selecting a specific quantizer scale for each macroblock in the picture. Multiplication of the Quantizer Scale, MQUANT, and the corresponding element of a Quantizer Matrix produces quantized (DCT) coefficients. In general, the higher the MQUANT value, the lower the bit rate but also the lower the quality (according to well-known rate-distortion theory).

Devising a rate-control (RC) algorithm is a part of the conventional encoding method. The rate-control algorithm monitors the number of bits that should be allocated to encode each picture or macroblock on the basis of image-type or image feature, respectively. Moreover, it should be devised to ensure that the decoder buffer does not experience an overflow or underflow during the time the stream is received from the communication channel and prepared for decoding. The following are typically employed in MPEG-2 compression schemes:

A. Target number-of-bits (or quantization scalers) for each picture type.

B. Buffer regulation to avoid overflow/underflow conditions.

C. Maintenance of a target rate or consumption of no more than the bit budget.

D. A rate-control strategy which ensures that all of the above are monitored/satisfied.

A conventional method of controlling the encoding rate by using the variable bit-rate (VBR) control method can be approximately divided into three steps. The first step (A) is a bit allocation step of allocating the (Target) number of bits-per-picture (suitable for the picture type I, P or B) to each frame; the second step is a rate control step of determining quantization scales, and the third step is an adaptive quantization step of adjusting the quantization scales for all the macroblocks of the picture type I, P or B.

In the bit allocation step, a "complexity" is defined by using a relation between the encoding rate and the distortion; the number of bits-per-picture of the current picture type (I, P or B) is determined with reference to the "complexity" of the previously encoded picture (of type I, P or B), and then the determined (Target) number of bits-per-picture is allocated. In the rate control step, the quantizer scale is computed on the basis of a virtual amount of buffer or the complexity of the previous picture (of type I, P or B). Here, since the quantizer scale is inversely proportional to the number of encoding bits, the number of encoding bits becomes smaller with increase of the quantizer scale. In the adaptive quantization step, a new quantizer scale is determined for the current macroblock by using the activity (degree of data variation) of the previous macroblock(s).

Such a conventional method of controlling an encoding rate by using the variable bit-rate control method has a problem, related to the bit allocation step, that in view of a variety of efforts to find the closest equation representing best the relation between the encoding rate and the distortion, it is difficult to define the exact rate-distortion (R-D) relationship, and even if the closest equation is defined, it cannot cope with the variations of the picture type (I, P or B).

Further, the conventional method of controlling an encoding rate also has a problem, related to the adaptive quantization step, in that a calculation of the new quantizer scales for all the macroblocks does not provide much higher picture quality improvement relative to its usage of bits. In order to mitigate this problem, a conventional method of using one quantizer scale for one entire picture may be employed, but this method is not effective when various features exist in the picture.

SUMMARY OF THE INVENTION

The present invention provides a method of controlling an encoding (bit) rate of a video encoder and a method of transmitting MPEG-2 encoded video data, which can improve picture quality, using a real time variable bit-rate (VBR) control method, wherein the number of bits-per-picture is allocated to a current picture on the basis of previous encoding results without defining a relation between an encoding rate and a distortion, a limited number of bits is not forced when features of the current picture are different from those of the previous pictures, and a quantizer scale is set adaptively to various features of the current picture without using an additional number of bits corresponding to variation of the quantizer scale.

The present invention also provides an encoding rate controller for a video encoder, and a video data transmission system having the encoding (bit) rate controller and performing an MPEG-2 video encoding, which can improve picture quality by using a real time variable bit-rate control method, wherein the number of bits-per-picture is allocated to a current picture on the basis of previous encoding results without defining a relation between an encoding rate and a distortion; a limited number of bits is not forced when features of the current picture are different from those of the previous pictures, and a quantizer scale is set adaptively to various features of the current picture without using an additional number of bits corresponding to variation of the quantizer scale.

According to an aspect of the present invention, there is provided a method of controlling an encoding (bit) rate of a video encoder, the method comprising steps of: (a) calculating a target number of bits-per-picture of a current picture type by using an average number of encoding bits-per-picture and an average target number of bits-per-picture of each picture type (I, P and B) of a previous group of pictures (GOP), and a buffer balance value; (b) calculating a quantizer scale value corresponding to a first macroblock-row of the current picture type by using an average quantizer scale value of a prior (e.g., last) picture out of the previous pictures of the current picture's type, and the target number of bits-per-picture; (c) calculating a target number of bits per unit row and a number of encoding bits per unit row in a previous row for each macroblock-row of the current picture type, calculating a quantizer scale value corresponding to the current row by using functions including the of the target number of bits-per-picture and the number of encoding bits per unit row, and calculating a total number of encoding bits of the current picture type; (d) storing the quantizer scale value output in the step of (c), and outputting the quantizer scale values of the previous macroblock-rows and the previous picture types; and (e) calculating the buffer balance value by using the total number of encoding bits-per-picture and the average target number of bits-per-picture of the current picture type.

The target number of bits-per-picture may be calculated by using the following equations:

$$Tavg_{i,p,b} = \frac{B_{i,p,b} \cdot (N_i + N_p + N_b)}{B_i \cdot N_i + B_p \cdot N_p + B_b \cdot N_b} \cdot \frac{bit\_rate}{frame\_rate}$$

$$T = Tavg_{i,p,b} - \frac{B_{i,p,b} \cdot (N_i + N_p + N_b)}{B_i \cdot N_i + B_p \cdot N_p + B_b \cdot N_b} \cdot \frac{d}{N_{dis}}$$

where T is the target number of bits-per-picture; $Tavg_{i,p,b}$ is the average target number of bits-per-picture for each picture type; $B_{i,p,b}$ is the average number of encoding bits-per-picture for each picture type; $N_i$, $N_p$ and $N_b$ are the number of I, P and B pictures in a group of pictures, respectively; $bit_{13}$ rate is a predetermined transmission rate; frame_rate is a frame rate; d is the buffer valance value; and $N_{dis}$ is the number of dispersed pictures.

The buffer balance value may be calculated by using the following equation:

$$d+ = S_{i,p,b} - Tavg_{i,p,b}$$

where d+ is the incremental change to the buffer balance value d; and $S_{i,p,b}$ is the total number of encoding bits of one picture for each picture type.

The average number of encoding bits $B_{i,p,b}$ for each picture type may be updated by using the following conditional expression:

If $(B_p < 1.2 \cdot B_b)$ $B_p = 1.2 \cdot B_b$;

If $(B_i < 1.2 \cdot B_p)$ $B_i = 1.2 \cdot B_p$;

If $(B_i > 3.5 \cdot B_p)$ $B_i = 3.5 \cdot B_p$;

If $(B_b < 0.6 \cdot B_p)$ $B_b = 0.6 \cdot B_b$.

The quantizer scale value corresponding to the first macroblock-rows of the current picture type may be calculated by using the following equations:

$$Q_{i,p,b} = \frac{1}{N_{row}} \cdot \sum_{j=1}^{N_{row}} mquant_j$$

$$\gamma = \frac{Tavg_{i,p,b} - T}{Tavg_{i,p,b}}$$

$$Q_{init} = Q_{i,p,b} + \frac{\gamma}{\delta}$$

where $Q_{i,p,b}$ is the average quantizer scale value, $mquant_j$ is a quantizer scale value corresponding to a j-th macroblock-row, $N_{row}$ is the total number of rows in a picture, $Tavg_{i,p,b}$ is the average target number of bits-per-picture for each picture type, T is the target number of bits-per-picture, $Q_{init}$ is a quantizer scale value corresponding to a first macroblock-row, and $\delta$ is a constant.

The quantizer scale value corresponding to each macroblock-row of the current picture type may be calculated by using the following equation associated with the functions:

If $(f(j,S_j,S_{j-1}, T_{row}) > \beta\_up_j)$, then $mquant_{j+1} = mquant\_up(mquant_j, q\_scale\_type)$;

else if $(g(j,S_j,S_{j-1}, T_{row}) > \beta\_dn_j)$, then $mquant_{j+1} = mquant\_dn(mquant_j, q\_scale\_type)$;

else $mquant_{j+} = mquant_j$.

where $S_j$ is the number of encoding bits from the first macroblock-row to a j-th macroblock-row in a picture; $T_{row}$ is a target number of bits per unit row; $mquant_{13}$ up($mquant_j$, q_scale_type) is a quantizer scale value corresponding to a code larger than a previous k-th code corresponding to $mquant_j$ in any one of a plurality of q_scale_types; mquant_dn ($mquant_j$, q_scale_type) is a quantizer scale value corresponding to a code smaller than the previous k-th code corresponding to $mquant_j$ in any one of a plurality of q_scale_types; and $\beta\_up_j$ and $\beta\_dn_j$ are first and second critical constants, respectively.

The functions of f and g may include the following expression representing the number of encoding bits in the previous row:

$S_j - S_{j-1}$.

The mquant_up($mquant_j$, q_scale_type) and mquant_dn($mquant_j$, q_scale_type) may be a quantizer scale value corresponding to a (k+1)-th code larger by one than a previous k-th code corresponding to $mquant_j$ in any one of a plurality of q_scale_types, and a quantizer scale value corresponding to a (k−1)-th code smaller by one than the previous k-th code corresponding to $mquant_j$ in any one of a plurality of q_scale_types, respectively.

According to another aspect of the present invention, there is provided a method of transmitting video data, the method comprising steps of: (a) receiving a quantizer scale value corresponding to a current macroblock-row of a current picture type, and encoding video input data in accordance with the quantizer scale value; (b) calculating the quantizer scale value corresponding to the current macroblock-row by using a target number of bits per unit row and the number of encoding bits per unit row in the previous macroblock-row for the encoded video data; and (c) outputting the encoded video data in accordance with a transmission rate.

Here, the step of (b) may comprise sub-steps of: (b–1) calculating the target number of bits-per-picture of the current picture type by using an average number of encoding bits-per-picture and an average target number of bits-per-picture of each picture type I, P and B of the previous group of pictures for the encoded video data, and a buffer balance value; (b–2) calculating the quantizer scale value corresponding to the first macroblock-row of the current picture type by using the average quantizer scale value of a previous (e.g., the latest) picture of the same type (I, P, or B) as the current picture's type, and the target number of bits; (b–3) calculating the target number of bits per unit row and the number of encoding bits per unit row in the previous row for each macroblock-row of the current picture type, calculating the quantizer scale value corresponding to a current row by using functions including the target number of bits per unit row and the number of encoding bits per unit row, and calculating a total number of encoding bits of the current picture type; (b–4) storing the quantizer scale value output in the sub-step of (b–3), and outputting the quantizer scale values of the previous macroblocks-rows and the previous picture types; and (b–5) calculating the buffer balance value by using the total number of encoding bits and the average target number of bits-per-picture of the current picture type.

According to still another aspect of the present invention, there is provided an encoding (bit) rate controller for a video encoder comprising a bit allocation unit, a rate control unit, an adaptive quantization unit, a memory, and a buffer rate calculating unit.

The bit allocation unit calculates a target number of bits-per-picture of a current picture type by using an average number of encoding bits and an average target number of bits-per-picture of each picture type I, P and B of a previous group of pictures (GOP) and a buffer balance value.

The rate control unit calculates and outputs a quantizer scale value corresponding to a first macroblock-row of the current picture type by using an average quantizer scale value of a latest picture type out of the previous picture types equal to the current picture type and the target number of bits.

The adaptive quantization unit calculates a target number of bits per unit row and a number of encoding bits per unit row in a previous row for each macroblock-row of the current picture type, calculates and outputs a quantizer scale value corresponding to the current row by using functions including the target number of bits per unit row and the number of encoding bits per unit row, and calculates and outputs a total number of encoding bits of the current picture type.

The memory stores the quantizer scale value output from the adaptive quantization unit, and outputs the quantizer scale values of the previous macroblock-rows and the previous picture types.

The buffer rate calculating unit calculates and outputs the buffer balance value by using the total number of encoding bits and the average target number of bits-per-picture of the current picture type.

According to still another aspect of the present invention, there is provided a video data transmission system comprising a video encoder, an encoding (bit) rate controller, and an encoder buffer.

The video encoder receives a quantizer scale value corresponding to a current macroblock-row of a current picture type, encodes video input data in accordance with the quantizer scale value, and outputs the encoded video data;

The encoding rate controller calculates and outputs a target number of bits-per-picture of the current picture type by using an average number of encoding bits and an average target number of bits per-picture of each picture type I, P and B of a previous group of pictures (GOP) and a buffer balance value, calculates and outputs a quantizer scale value corresponding to a first macroblock-row of the current picture type by using an average quantizer scale value of a prior (e.g., latest) picture of the same type as the current picture, and calculates and outputs a quantizer scale value corresponding to the current macroblock-row by using functions including the target number of bits per unit row and the number of encoding bits per unit row in the previous macroblock-row.

The encoder buffer outputs the encoded video data in accordance with a transmission rate.

BRIEF DESCRIPTION OF THE DRAWINGS

The above and other features of the present invention will become more apparent from detailed description of exemplary embodiments thereof with reference to the attached drawings in which.

DETAILED DESCRIPTION OF THE INVENTION

The present invention and operational advantages thereof can be fully understood by referring to the attached drawings and explanations thereof.

Exemplary embodiments of the present invention will be described in detail with reference to the attached drawings. In the drawings, the same reference numerals indicate the same elements.

Figure 1:
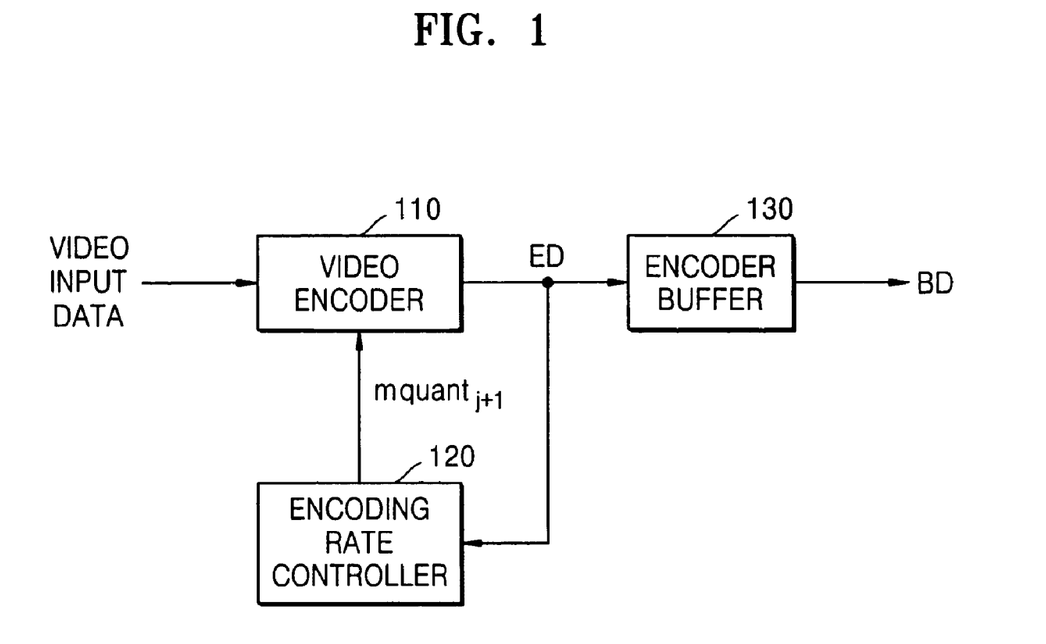
FIG. 1 is a block diagram illustrating a moving picture expert group 2 (MPEG-2) video data transmission system having an encoding rate controller according to an embodiment of the present invention.

FIG. 1 is a block diagram illustrating a moving picture expert group 2 (MPEG-2) video data transmission system having an encoding (bit) rate controller according to an embodiment of the present invention. In FIG. 1, a video data transmission system according to an embodiment of the present invention comprises a video encoder 110, an encoding (bit) rate controller 120, and an encoder buffer 130.

The video encoder 110 receives video input data and a quantizer scale value (mquant$_{j+1}$) corresponding to a current macroblock-row of a current picture type, encodes the video input data in accordance with the quantizer scale value (mquant$_{j+1}$), and outputs the encoded video data ED. The video input data may be generally R, G, B signals or Y, Pb, Pr signals which may be video data obtained from a video camera, etc. and output as 8-bit digital signals, but the video input data is not limited to these examples.

The encoding (bit) rate controller 120 calculates a target number of bits-per-picture T associated with the current picture type by using an average number of encoding bits $B_{i,p,b}$ and an average target number of bits-per-picture Tavg$_{i,p,b}$ of each picture type I, P and B of a previous group of pictures (GOP) of the encoded video data ED, and a buffer balance value d. The encoding rate controller 120 calculates and outputs an initial quantizer scale value $Q_{init}$ corresponding to the first macroblock-row of the current picture type by using an average quantizer scale value $Q_{i,p,b}$ of a prior (e.g., latest) picture of the same type as the current picture. Generally, the encoding (bit) rate controller 120 calculates and outputs a quantizer scale value mquant$_{j+1}$ corresponding to the current macroblock-row by using functions of the target number of bits per unit row T$_{row}$ and of the number of encoding bits $S_j - S_{j-1}$ per unit row in the previous macroblock-row.

A GOP generally comprises fifteen pictures, and time required for transmitting two GOPs may be unit second. The picture types constituting a GOP are transmitted in the order of I, B, B, P, B, B, P, B, B, P, ..., and a time corresponding to one picture type is equal to a time corresponding to one frame.

The encoder buffer i30 outputs the encoded video data ED in accordance with a predetermined transmission rate. The transmission rate is about 20 Mbps for digital televisions (DTVs), and about 5 Mbps for digital video disks (DVD). The video data BD output from the encoder buffer 130 are data compressed in accordance with a moving picture expert group 2 (MPEG-2) standard, and can be transported through wireless LANs or DTV transmitters, and then output as radio frequency (RF) signals. In addition, the compressed video data BD can be coded and recorded on media such as DVD optical disks, etc.

The present invention relates specifically to a control of an encoding (bit) rate through a variable bit-rate (VBR) control method of the encoding (bit) rate controller 120.

Figure 2:
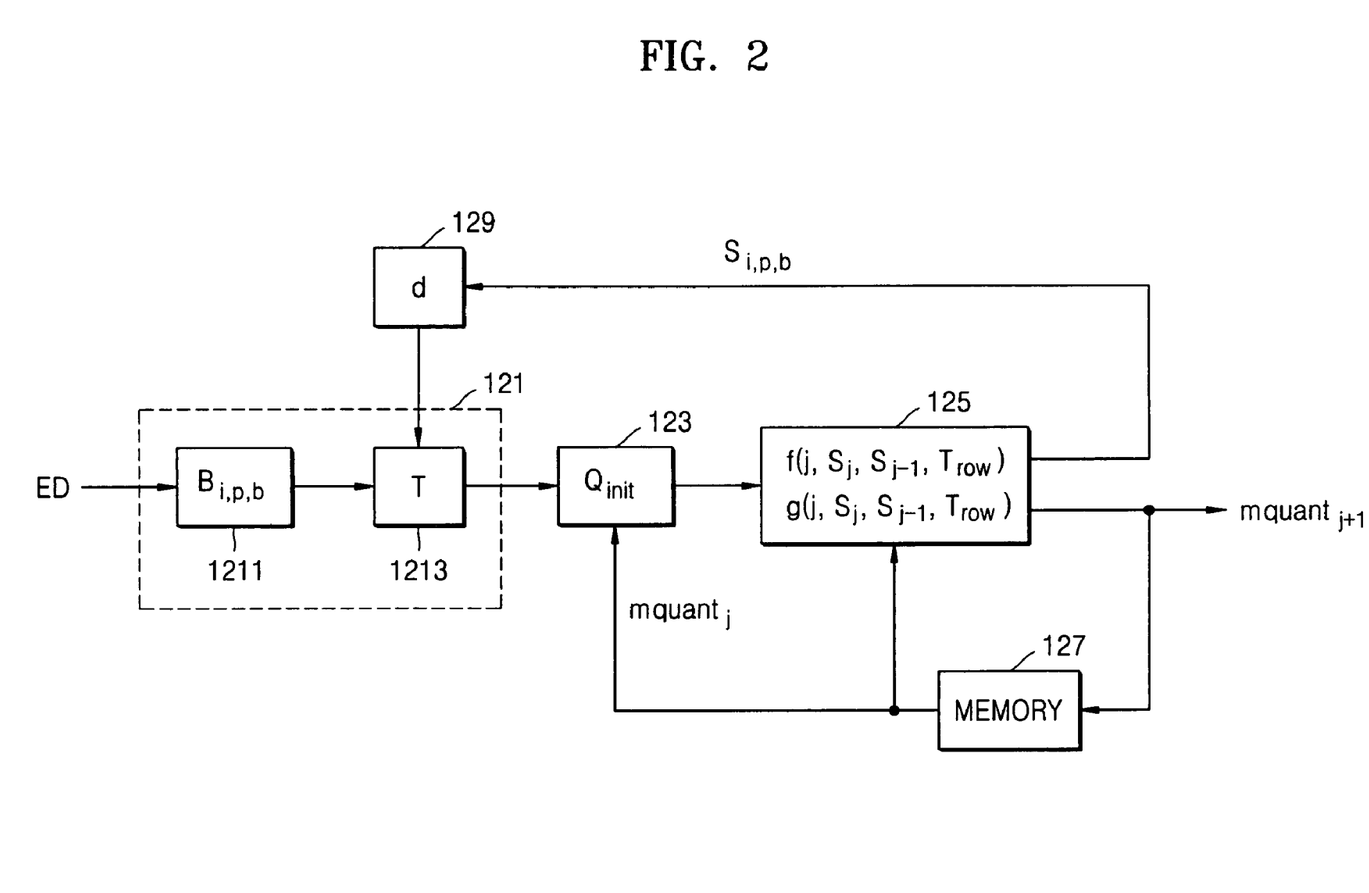
FIG. 2 is a block diagram specifically illustrating the encoding rate controller shown in FIG. 1.

FIG. 2 is a block diagram specifically illustrating the encoding (bit) rate controller 120 shown in FIG. 1.

In FIG. 2, the encoding rate controller 120 (also shown in FIG. 1) comprises a bit allocation unit 121, a rate control unit 123, an adaptive quantization unit 125, and a buffer rate calculating unit 129.

The bit allocation unit 121 calculates and outputs the target number of bits-per-picture T of a current picture type by using the average number of encoding bits $B_{i,p,b}$ and the average target number of bits-per-picture Tavg$_{i,p,b}$ of each picture type I, P and B of a previous GOP, and a buffer balance value d. The target number of bits-per-picture T is calculated by using Equation 1 and Equation 2. In FIG. 2, an average number of encoding bits calculating unit 1211 receives the encoded video data ED, and calculates the average number of encoding bits $B_{i,p,b}$ (per picture) of each picture type. The general expression $B_{i,p,b}$ indicates the average number of encoding bits (per picture) of each picture type I, P and B; and more specifically, $B_i$, $B_p$ and $B_b$ indicates the average number of encoding bits for a picture of types I, P and B, respectively. A target number-of-bits calculating unit 1213 calculates and outputs the target number of bits-per-picture T by using Equation 1 and Equation 2.

$$Tavg_{i,p,b} = \frac{B_{i,p,b} \cdot (N_i + N_p + N_b)}{B_i \cdot N_i + B_p \cdot N_p + B_b \cdot N_b} \cdot \frac{bit\_rate}{frame\_rate} \quad \text{(Equation 1)}$$

where Tavg$_{i,p,b}$ is the average target number of bits-per-picture for each picture type, $B_{i,p,b}$ is the average number of encoding bits for each picture type, $N_i$, $N_p$ and $N_b$ are the number of I, P and B pictures in a group of pictures GOP, respectively, bit_rate is the predetermined transmission rate, and frame_rate is the frame rate. The general expression Tavg$_{i,p,b}$ indicates the average target number of bits-per-picture of each picture of type I, P and B; and more specifically, Tavg$_i$, Tavg$_p$ and Tavg$_b$ indicates the average target number of bits-per-picture for a picture of types I, P and B, respectively. $N_i$, $N_p$ and $N_b$, indicate the numbers of I, P and B pictures, respectively, are in the above example equal to 1, 4 and 10, respectively. Bit_rate, which indicates a predetermined transmission rate, is the number of bits transmitted per second. And frame_rate, which indicates a frame rate, is the number of frames transmitted per second.

$$T = Tavg_{i,p,b} - \frac{B_{i,p,b} \cdot (N_i + N_p + N_b)}{B_i \cdot N_i + B_p \cdot N_p + B_b \cdot N_b} \cdot \frac{d}{N_{dis}} \quad \text{(Equation 2)}$$

where T is the target number of bits; d is the buffer valance value; and $N_{dis}$ is the number of dispersed pictures. $N_{dis}$, indicates the number of dispersed pictures for dispersing influence of the buffer balance, and in the above example is 30 which is the number of frames corresponding to one second in the above example.

The buffer balance value d is calculated by using Equation 2 and Equation 3. Equation 3 is calculated by the buffer rate calculating unit 129. Here, as can be seen from Equation 2, when the buffer balance value d has a negative value, the target number of bits-per-picture T of the current picture type is increased.

$$d+=S_{i,p,b}-Tavg_{i,p,b} \quad \text{(Equation 3)}$$

where d+ is the delta (difference) in the buffer balance value; and $S_{i,p,b}$ is the total number of encoding bits of one picture for each picture type. The general expression $S_{i,p,b}$ indicates a total number of encoding bits of a picture for each picture type, and represents $S_i$, $S_p$ and $S_b$ for the picture types I, P and B, respectively. Equation 3 represents "d(i)=d(i−1)+$S_{i,p,b}$−$Tavg_{i,p,b}$", where d(i) indicates a buffer balance value of the current picture, and d(i−1) indicates a buffer balance value of the previous picture.

The average number of encoding bits $B_{i,p,b}$ for each picture type may be amended by using an conditional expression such as Equation 4.

If $(B_p<1.2 \cdot B_b)$ $B_p=1.2 \cdot B_b$;

If $(B_i<1.2 \cdot B_p)$ $B_i=1.2 \cdot B_p$;

If $(B_i>3.5 \cdot B_p)$ $B_i=3.5 \cdot B_p$;

If $(B_b<0.6 \cdot B_p)$ $B_b=0.6 \cdot B_b$. (Equation 4)

The rate control unit 123 calculates and outputs the initial quantizer scale value $Q_{init}$ corresponding to a first macroblock-row of the current picture type by using the average quantizer scale value $Q_{i,p,b}$ of a prior (e.g., the latest) picture out of the previous pictures of the current picture's type, and the target number of bits-per-picture T. The initial quantizer scale value $Q_{init}$ corresponding to the first macroblock-row is $mquant_1$. The initial quantizer scale value $Q_{init}$ corresponding to the first macroblock-row of the current picture type is calculated by using Equations 5 through 7. Equation 7 is obtained by using Equation 6.

$$Q_{i,p,b} = \frac{1}{N_{row}} \cdot \sum_{j=1}^{N_{row}} mquant_j \quad \text{(Equation 5)}$$

where $Q_{i,p,b}$ is the average quantizer scale value; $mquant_j$ is the quantizer scale value corresponding to a j-th macroblock-row; and $N_{row}$ is the total number of rows in a picture.

$$\gamma = \frac{Tavg_{i,p,b} - T}{Tavg_{i,p,b}} \quad \text{(Equation 6)}$$

where $Tavg_{i,p,b}$ is the average target number of bits-per-picture for each picture type; T is the target number of bits-per-picture; and $Q_{init}$ is the (initial) quantizer scale value corresponding to a first macroblock-row.

$$Q_{init} = Q_{i,p,b} + \frac{\gamma}{\delta} \quad \text{(Equation 7)}$$

where δ is a constant.

Figure 4:
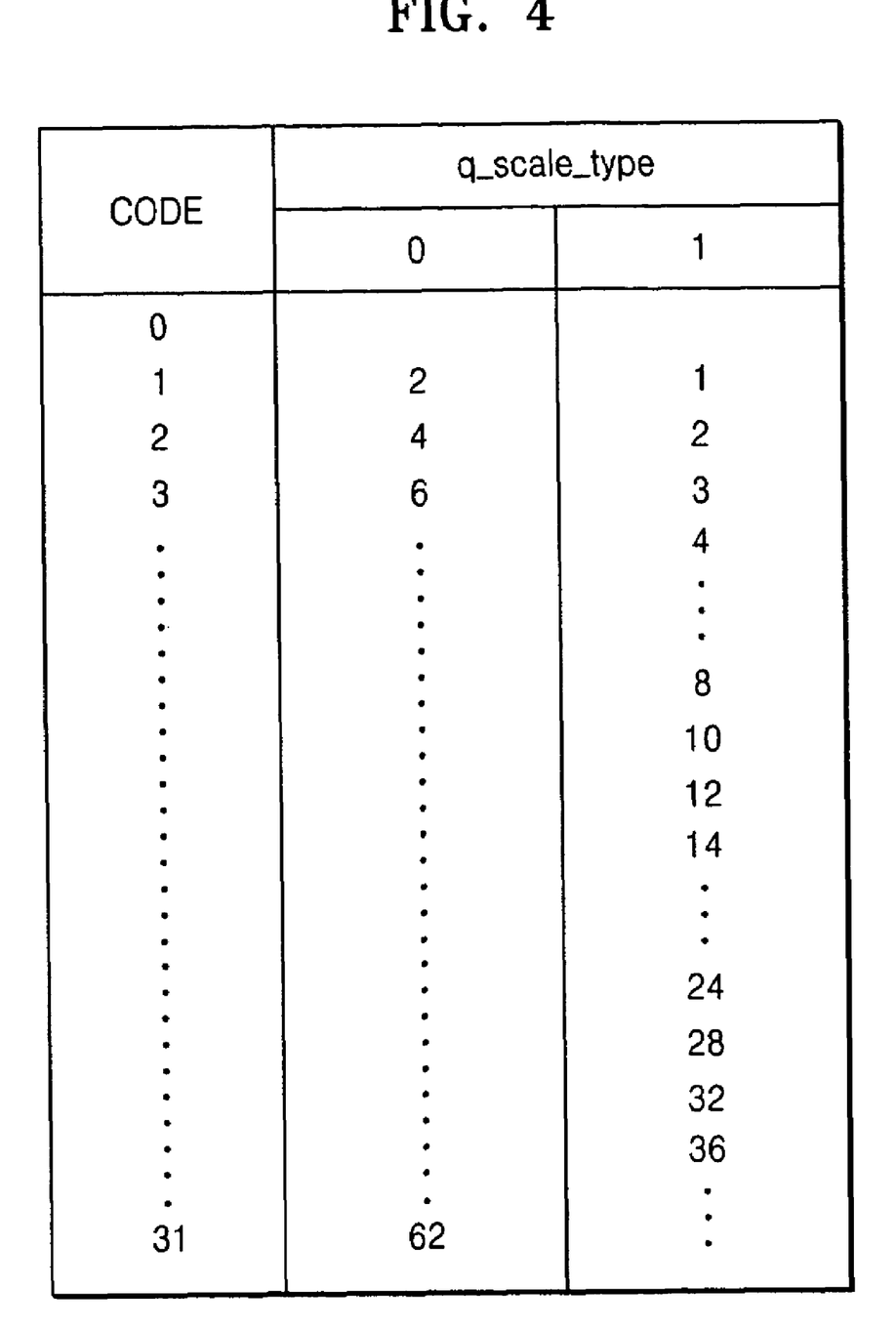
FIG. 4 is a table showing an example of quantization scales for mquant types for explanation of an adaptive quantization process.

The adaptive quantization unit 125 calculates the target number of bits per unit row $T_{row}$ and the number of encoding bits $S_j-S_{j-1}$ per unit row in a previous row for each macroblock-row of the current picture type correspondingly to the respective macroblock-rows of the current picture type, calculates and outputs a quantizer scale value $mquant_{j+1}$ corresponding to the current row by using functions of f and g including the target number of bits per unit row $T_{row}$ and the number of encoding bits $S_j-S_{j-1}$ per unit row, and calculates and outputs the total number of encoding bits $S_{i,p,b}$ of the current picture type. The quantizer scale value $mquant_{j+1}$ corresponding to each macroblock-row of the current picture type is calculated by using Equation 8 relating to the functions of f and g. The functions of f and g in Equation 8 include the number of encoding bits "$S_j-S_{j-1}$" of the previous row. In the example representing the quantizer scale for each mquant type shown in FIG. 4, mquant_up($mquant_j$, q_scale_type) and mquant_dn($mquant_j$, q_scale_type) in Equation 8 are a quantizer scale value corresponding to a (k+1)-th code larger by one than a previous k-th code corresponding to $mquant_j$ in any one of a plurality of q_scale_types, and a quantizer scale value corresponding to a (k−1)-th code smaller by one than the previous k-th code corresponding to $mquant_j$ in any one of a plurality of q_scale_types, respectively. For example, when the previous k-th code corresponding to $mquant_j$ in FIG. 4 is 2 and the quantizer scale value in the q_scale_type of "0" is 4, mquant_up($mquant_j$, q_scale_type) and mquant_dn ($mquant_j$, q_scale_type) indicates the quantizer scale values 6 and 2 corresponding to the "k+1"-th code and the "k−1"-th code, respectively.

The memory 127 stores the quantizer scale value $mquant_{j+1}$ output from the adaptive quantization unit 125, and outputs the quantizer scale values $mquant_j$ of the previous macroblock-rows and the previous picture types.

The buffer rate calculating unit 129 calculates the buffer balance value d from Equation 3 by using the total number of encoding bits $S_{i,p,b}$ and the average target number of bits-per-picture $Tavg_{i,p,b}$ of the current picture type, and then outputs it.

If $(f(j,S_j,S_{j-1}, T_{row})>\beta\_up_j)$, then $mquant_{j+1}=mquant\_up(mquant_j,q\_scale\_type)$;

else if $(g(j,S_j,S_{j-1}, T_{row})>\beta\_dn_j)$, then $mquant_{j+1}=mquant\_dn(mquant_j,q\_scale\_type)$;

else $mquant_{j+1}=mquant_j$. (Equation 8)

where $S_j$ is the number of encoding bits from the first macroblock-row to a j-th macroblock-row in a picture; $T_{row}$ is the target number of bits per unit row; mquant_up($mquant_j$, q_scale_type) is the quantizer scale value corresponding to a code larger than a previous k-th code corresponding to $mquant_j$ in any one of a plurality of q_scale_types; mquant_dn ($mquant_j$, q_scale_type) is the quantizer scale value corresponding to a code smaller than the previous k-th code corresponding to mquant$_j$ in any one of a plurality of q_scale_types; and β_up$_j$ and β_dn$_j$ are first and second critical constants, respectively.

The operation of the encoding rate controller 120 according to an embodiment of the present invention will now be described in more detail.

Figure 3:
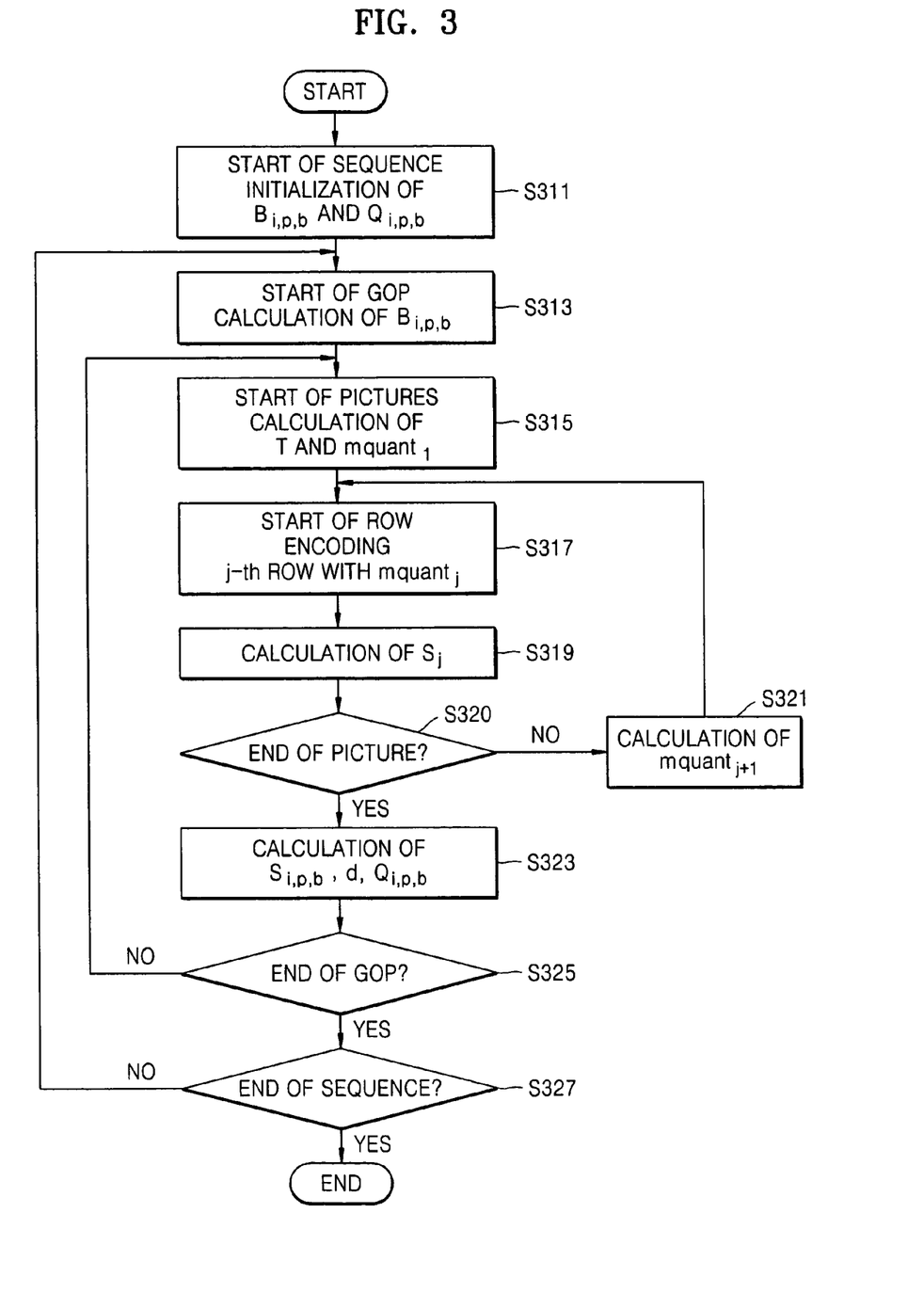
FIG. 3 is a flowchart illustrating operation of the encoding rate controller.

FIG. 3 is a flowchart illustrating the method of operation of the encoding (bit) rate controller 120.

When the video encoder 110 shown in FIG. 1 starts its encoding process, the encoding rate controller 120 resets and initializes (S311) the average number of encoding bits $B_{i,p,b}$ (per picture) of each picture type I, P and B of the previous group of pictures and the average quantizer scale value $Q_{i,p,b}$ of the latest picture out of the previous pictures of the current picture's type (e.g.), and then a step (S313) of starting encoding of a group of pictures (S313) is performed. When each picture of type I, P and B in the current group of pictures has been encoded, the average encoding bit calculating unit 1211 calculates the average number of encoding bits $B_{i,p,b}$ of the pictures of type I, P and B in the previous group of pictures (S313).

Then, the target bit calculating unit 1213 calculates the target number of bits-per-picture T of the current picture type from Equation 2 by using the average target number of bits-per-picture $Tavg_{i,p,b}$ and the buffer balance value d. At this time, the rate control unit 123 calculates the initial quantizer scale value $Q_{init}$ corresponding to the first macroblock-row of the current picture type by using the average quantizer scale value $Q_{i,p,b}$ of the latest picture out of the previous pictures of the current picture's type, by using Equation 7 (S315).

When a step S317 of calculating the quantizer scale value mquant$_{j+1}$ for the macroblock-rows constituting each picture is preformed, the adaptive quantization unit 125 calculates the number of encoding bits $S_j-S_{j-1}$ in the previous macroblock-row (S319), and calculates the quantization scale value mquant$_{j+1}$ corresponding to the current macroblock-row until the last row of the current picture from Equation 8 in accordance with the functions f and g including the target number of bits per unit row $T_{row}$ (S320 and S321).

When the calculation is finished for one picture, the adaptive quantization unit 125 calculates and outputs the total number of encoding bits $S_{i,p,b}$ of the current picture type. At this time, for calculation for a next picture, the buffer rate calculating unit 129 calculates the buffer balance value d by using Equation 3, and the rate control unit 123 calculates again the average quantizer scale value $Q_{i,p,b}$ of the last picture out of the previous picture being of the same type as the current picture by using Equation 5 (S323). When the encoding of a group of pictures is finished, the average encoding bit calculating unit 1211 calculates again the average number of encoding bits $B_{i,p,b}$ of a previous picture of each type I, P and B (S325, S313). In order to calculate the quantizer scale value mquant$_{j+1}$ for each picture in a new group of pictures, the above described procedure is repeated until the encoding sequence is ended (S327).

As described above, the encoding (bit) rate controller 120 according to an embodiment of the present invention comprises the bit allocation unit 121, a rate control unit 123 and the adaptive quantization unit 125, and thus calculates and outputs in real time the quantizer scale value mquant$_{j+1}$ corresponding to each macroblock-row of the current picture by using a variable bit-rate control (VBR) method in which the limited number of bits is not forced when features of the current picture are different from those of the previous pictures, and the quantizer scale is set adaptively to various features of the current picture without using an additional number of bits corresponding to variation of the quantizer scale.

As described above, the encoding rate controller and the video data transmission system according to the present invention allocate the number of bits to the current picture on the basis of the previous encoding results without defining the relation between the encoding (bit) rate and the distortion, do not force the limited number of bits when features of the current picture are different from those of the previous pictures, and set the quantizer scale adaptively to various features of the current picture without using an additional number of bits corresponding to variation of the quantizer scale. Therefore, it is possible to improve picture quality of video data to be displayed on a monitor by using such real time variable bit-rate control.

While the present invention has been particularly shown and described with reference to exemplary embodiments thereof, it will be understood by those skilled in the art that various changes in form and details may be made therein without departing from the spirit and scope of the present invention as defined by the following claims.

What is claimed is:

1. A method of controlling an encoding rate of a video encoder, the method comprising the steps of:
   (a) calculating a target number of bits-per-picture of a current picture type by using the average number of encoding bits-per-picture and the average target number of bits-per-picture of each picture type I, P, and B of a previous group of pictures (GOP) and a buffer balance value;
   (b) calculating a quantizer scale value corresponding to a first macroblock-row of the current picture type by using the average quantizer scale value of a previous picture of the same type as the current picture and using the target number of bits;
   (c) calculating a target number of bits per unit row and a number of encoding bits per unit row in a previous row for each macroblock-row of the current picture type, calculating a quantizer scale value corresponding to the current row by using functions of the target number of bits-per-picture and the number of encoding bits per unit row, and calculating a total number of encoding bits-per-picture of the current picture type;
   (d) storing the quantizer scale value calculated in step (c), and outputting the quantizer scale values of the previous macroblock-rows and of the previous picture types; and
   (e) calculating the buffer balance value by using the total number of encoding bits-per-picture and the average target number of bits-per-picture of the current picture type.

2. The method according to claim 1, wherein the target number of bits-per-picture is calculated by using the following equations:

$$Tavg_{i,p,b} = \frac{B_{i,p,b} \cdot (N_i + N_p + N_b)}{B_i \cdot N_i + B_p \cdot N_p + B_b \cdot N_b} \cdot \frac{\text{bit\_rate}}{\text{frame\_rate}}$$

$$T = Tavg_{i,p,b} - \frac{B_{i,p,b} \cdot (N_i + N_p + N_b)}{B_i \cdot N_i + B_p \cdot N_p + B_b \cdot N_b} \cdot \frac{d}{N_{dis}}$$

where T is the target number of bits-per-picture; $Tavg_{i,p,b}$ is the average target number of bits-per-picture for each picture type; $B_{i,p,b}$ is the average number of encoding bits-per-picture for each picture type; $N_i$, $N_p$ and $N_b$ are the number of I, P and B pictures in a group of pictures, respectively; bit_rate is a predetermined transmission rate; frame_rate is a frame rate; d is the buffer valance value; and $N_{dis}$ is the number of dispersed pictures.

3. The method according to claim 2, wherein the buffer balance value is calculated by using the following equation:

$$d+ = S_{i,p,b} - Tavg_{i,p,b}$$

where d+ is the incremental change of the buffer balance value d, and $S_{i,p,b}$ is the total number of encoding bits of one picture for each picture type.

4. The method according to claim 2, wherein the average number of encoding bits-per-picture $B_{i,p,b}$ for each picture type is updated by using the following conditional expression:

If($B_p$<1.2·$B_b$) $B_p$=1.2·$B_b$;
If($B_i$<1.2·$B_p$) $B_i$=1.2·$B_p$;
If($B_i$>3.5·$B_p$) $B_i$=3.5·$B_p$;
If($B_b$<0.6·$B_b$) $B_b$=0.6·$B_p$.

5. The method according to claim 2, wherein the quantizer scale value corresponding to the first macroblock-row of the current picture type is calculated by using the following equations:

$$Q_{init} = Q_{i,p,b} + \frac{\gamma}{\delta}$$

$$\gamma = \frac{Tavg_{i,p,b} - T}{Tavg_{i,p,b}}$$

$$Q_{i,p,b} = \frac{1}{N_{row}} \cdot \sum_{j=1}^{N_{row}} mquant_j$$

where $Q_{i,p,b}$ is the average quantizer scale value;, $mquant_j$ is a quantizer scale value corresponding to a j-th macroblock-row; $N_{row}$ is the total number of rows in a picture; $Tavg_{i,p,b}$ is the average target number of bits-per-picture for each picture type; T is the target number of bits, $Q_{init}$ is a quantizer scale value corresponding to a first macroblock-row; and $\delta$ is a constant.

6. The method according to claim 5, wherein the quantizer scale value corresponding to each macroblock-row of the current picture type is calculated by using the following equation associated with the functions:

If $(f(j,S_j,S_{j-1}, T_{row})>\beta\_up_j)$, then $mquant_{j+1}$=mquant_up($mquant_j$,q_scale_type);

else if $(g(j,S_j,S_{j-1}, T_{row})>\beta\_dn_j)$, then $mquant_{j+1}$=mquant_dn($mquant_j$,q_scale_type);

else $mquant_{j+1}$=$mquant_j$/ where $S_j$ is the number of encoding bits from the first macroblock-row to a j-th macroblock-row in a picture; $T_{row}$ is a target number of bits per unit row; mquant_up($mquant_j$, q_scale type) is a quantizer scale value corresponding to a code larger than a previous k-th code corresponding to $mquant_j$ in any one of a plurality of q_scale_types; mquant_dn($mquant_j$, q_scale_type) is a quantizer scale value corresponding to a code smaller than the previous k-th code corresponding to $mquant_j$ in any one of a plurality of q_scale_types; and $\beta\_up_j$ and $\beta\_dn_j$ are first and second critical constants, respectively.

7. The method according to claim 6, wherein the functions of f and g include an expression representing the number of encoding bits in the previous row.

8. The method according to claim 6, wherein the mquant_up($mquant_j$, q_scale_type) and the mquant_dn($mquant_j$,q_scale_type) are a quantizer scale value corresponding to a (k+1)-th code larger by one than a previous k-th code corresponding to $mquant_j$ in any one of a plurality of q_scale_types, and a quantizer scale value corresponding to a (k-1)-th code smaller by one than the previous k-th code corresponding to $mquant_j$ in any one of a plurality of q_scale_types, respectively.

9. A method of transmitting video data, the method comprising steps of:
(a) receiving a quantizer scale value corresponding to a current macroblock-row of a current picture type, and encoding video data in accordance with the quantizer scale value;
(b) calculating the quantizer scale value corresponding to the current macroblock-row by using a target number of bits per unit row and the number of encoding bits per unit row in the previous macroblock-row for the encoded video data;
wherein the step of (b) comprises:
(b-1) calculating the target number of bits-per-picture of the current picture type by using an average number of encoding bits-per-picture and an average target number of bits-per-picture of each picture type I, P and B of the previous group of pictures for the encoded video data and a buffer balance value;
(b-2) calculating the quantizer scale value corresponding to the first macroblock-row of the current picture type by using the average quantizer scale value of the last picture out of the previous pictures of the current picture's type, and the target number of bits-per-picture;
(b-3) calculating the target number of bits per unit row and the number of encoding bits per unit row in the previous row for each macroblock-row of the current picture type, calculating the quantizer scale value corresponding to a current row by using functions including the target number of bits per unit row and the number of encoding bits per unit row, and calculating a total number of encoding bits-per-picture of the current picture type;
(b-4) storing the quantizer scale value output in the sub-step of (b-3), and outputting the quantizer scale values of the previous macroblock-rows and the previous picture types; and
(b-5) calculating the buffer balance value by using the total number of encoding bits and the average target number of bits-per-picture of the current picture type; and
(c) outputting the encoded video data in accordance with a transmission rate.

10. An encoding rate controller for a video encoder comprising:
a bit allocation unit which calculates a target number of bits-per-picture of a current picture type by using an average number of encoding bits-per-picture and an average target number of bits-per-picture of each picture type I, P and B of a previous group of pictures (GOP) and a buffer balance value;
a rate control unit which calculates a quantizer scale value corresponding to a first macroblock-row of the current picture type by using an average quantizer scale value of the last picture out of the previous pictures of the current picture's type, and the target number of bits per unit row;
an adaptive quantization unit which calculates a target number of bits per unit row and a number of encoding bits per unit row in a previous row for each macroblock-row of the current picture type, calculates a quantizer scale value corresponding to the current row by using functions including the target number of bits per unit row and the number of encoding bits per unit row, and calculates a total number of encoding bits of the current picture type;

a memory which stores the quantizer scale value calculated by the adaptive quantization unit, and outputs the quantizer scale values of the previous macroblock-rows and the previous picture types; and a buffer rate calculating unit which calculates the buffer balance value by using the total number of encoding bits-per-picture and the average target number of bits-per-picture of the current picture type.

11. The encoding rate controller according to claim 10, wherein the target number of bits-per-picture is calculated by using the following equations:

$$Tavg_{i,p,b} = \frac{B_{i,p,b} \cdot (N_i + N_p + N_b)}{B_i \cdot N_i + B_p \cdot N_p + B_b \cdot N_b} \cdot \frac{bit\_rate}{frame\_rate}$$

$$T = Tavg_{i,p,b} - \frac{B_{i,p,b} \cdot (N_i + N_p + N_b)}{B_i \cdot N_i + B_p \cdot N_p + B_b \cdot N_b} \cdot \frac{d}{N_{dis}}$$

where T is the target number of bits-per-picture; $Tavg_{i,p,b}$ is the average target number of bits-per-picture for each picture type; $B_{i,p,b}$ is the average number of encoding bits-per-picture for each picture type; $N_i$, $N_p$ and $N_b$ are the number of I, P and B pictures in a group of pictures, respectively; bit_rate is a predetermined transmission rate; frame_rate is a frame rate; d is the buffer valance value; and $N_{dis}$ is the number of dispersed pictures.

12. The encoding rate controller according to claim 11, wherein the buffer balance value is calculated by using the following equation:

$$d+=S_{i,p,b}-Tavg_{i,p,b}$$

where d+ is the incremental change of the buffer balance value d, and $S_{i,p,b}$ is the total number of encoding bits of one picture for each picture type.

13. The encoding rate controller according to claim 11, wherein the average number of encoding bits-per-picture $B_{i,p,b}$ for each picture type is filtered by using the following conditional expression:

If($B_p$<1.2·$B_b$) $B_p$=1.2·$B_b$;
If($B_i$<1.2·$B_p$) $B_i$=1.2·$B_p$;
If($B_i$>3.5·$B_p$) $B_i$=3.5·$B_p$;
If($B_b$<0.6·$B_p$) $B_b$=0.6·$B_p$.

14. The encoding rate controller according to claim 11, wherein the quantizer scale value corresponding to the first macroblock-rows of the current picture type is calculated by using the following equations:

$$Q_{init} = Q_{i,p,b} + \frac{\gamma}{\delta}$$

$$\gamma = \frac{Tavg_{i,p,b} - T}{Tavg_{i,p,b}}$$

$$Q_{i,p,b} = \frac{1}{N_{row}} \cdot \sum_{j=1}^{N_{row}} mquant_j$$

where $Q_{i,p,b}$ is the average quantizer scale value; $mquant_j$ is a quantizer scale value corresponding to a j-th macroblock-row; $N_{row}$ is the number of total rows in a picture; $Tavg_{i,p,b}$ is the average target number of bits-per-picture for each picture type; T is the target number of bits-per-picture; $Q_{init}$ is a quantizer scale value corresponding to a first macroblock-row; and δ is a constant.

15. The encoding rate controller according to claim 14, wherein the quantizer scale value $mquant_{j+1}$ corresponding to each macroblock-row of the current picture type is calculated by using the following equation associated with the functions:

If $(f(j, S_j, S_{j-1}, T_{row})>\beta\_up_j)$, then $mquant_{j+1}=mquant\_up(mquant_j,q\_scale\_type)$;

else if $(g(j, S_j, S_{j-1}, T_{row})>\beta\_dn_j)$, then $mquant_{j+1}=mquant\_dn(mquant_j,q\_scale\_type)$;

else $mquant_{j+1}=mquant_j$;

where $S_j$ is the number of encoding bits from the first macroblock-row to a j-th macroblock-row in a picture; $T_{row}$ is a target number of bits per unit row; $mquant\_up(mquant_j, q\_scale\_type)$ is a quantizer scale value corresponding to a code larger than a previous k-th code corresponding to $mquant_j$ in any one of a plurality of q_scale_types; $mquant\_dn(mquant_j, q\_scale\_type)$ is a quantizer scale value corresponding to a code smaller than the previous k-th code corresponding to $mquant_j$ in any one of a plurality of q_scale_types, and $\beta\_up_j$ and $\beta\_dn_j$ are first and second critical constants, respectively.

16. The encoding rate controller according to claim 15, wherein the functions of f and g include an expression representing the number of encoding bits in the previous row.

17. The encoding rate controller according to claim 15, wherein $mquant\_up(mquant_j, q\_scale\_type)$ is a quantizer scale value corresponding to a (k+1)-th code larger by one than a previous k-th code corresponding to $mquant_j$ in any one of a plurality of q_scale_types, and $mquant\_dn(mquant_j, q\_scale\_type)$ is a quantizer scale value corresponding to a (k−1)-th code smaller by one than the previous k-th code corresponding to $mquant_j$ in any one of a plurality of q_scale_types.

18. A video data transmission system comprising:
a video encoder that receives a quantizer scale value corresponding to a current macroblock-row of a current picture type, encodes video input data in accordance with the quantizer scale value, and outputs the encoded video data;
an encoding rate controller that calculates the quantizer scale value corresponding to the current macroblock-row by using a target number of bits per unit row and the number of encoding bits per unit row in the previous macroblock-row for the encoded video data; and
an encoder buffer that outputs the encoded video data in accordance with a transmission rate, wherein the encoding rate controller comprises:
a bit allocation unit that calculates a target number of bits-per-picture of a current picture type by using an average number of encoding bits-per-picture and an average target number of bits-per-picture of each picture type I, P and B of the previous group of pictures for the encoded video data, and a buffer balance value;
a rate control unit that calculates a quantizer scale value corresponding to the first macroblock-row of the current picture type by using an average quantizer scale value of a prior picture of the same type as the current picture, and the target number of bits;
an adaptive quantization unit that calculates a target number of bits per unit row and a number of encoding bits per unit row in the previous row for each macroblock-row of the current picture type, calculates a quantizer scale value corresponding to the current row by using functions including the target number of bits per unit row and the number of encoding bits per unit row, and calculates a total number of encoding bits of the current picture type;

a memory that stores the quantizer scale value calculated by the adaptive quantization unit, and outputs the quantizer scale values of the previous macroblock-rows and the previous picture types; and a buffer rate calculating unit that calculates the buffer balance value by using the total number of encoding bits-per-picture and the average target number of bits-per-picture of the current picture type.

* * * * *